(12) United States Patent
Ulsh

(10) Patent No.: US 9,562,372 B2
(45) Date of Patent: Feb. 7, 2017

(54) LOCKING COVER FOR UTILITY POLE

(71) Applicant: Randy L. Ulsh, Graham, WA (US)

(72) Inventor: Randy L. Ulsh, Graham, WA (US)

( * ) Notice: Subject to any disclaimer, the term of this patent is extended or adjusted under 35 U.S.C. 154(b) by 0 days.

(21) Appl. No.: 15/130,474

(22) Filed: Apr. 15, 2016

(65) Prior Publication Data

US 2016/0305162 A1 Oct. 20, 2016

Related U.S. Application Data

(60) Provisional application No. 62/148,014, filed on Apr. 15, 2015.

(51) Int. Cl.
*E05B 65/00* (2006.01)
*E05B 67/38* (2006.01)
*E05B 73/00* (2006.01)
*F16B 41/00* (2006.01)

(52) U.S. Cl.
CPC .......... *E05B 65/0089* (2013.01); *E05B 67/38* (2013.01); *E05B 73/00* (2013.01); *F16B 41/005* (2013.01); *Y10T 70/5858* (2015.04); *Y10T 70/5867* (2015.04)

(58) Field of Classification Search
CPC ...... E05B 65/0089; E05B 67/38; E05B 73/00; Y10T 292/0982; Y10T 70/5867; Y10T 70/5858; F16B 41/005
USPC .... 70/58, 166, 168, 169, 229–232; 411/373, 411/910
See application file for complete search history.

(56) References Cited

U.S. PATENT DOCUMENTS

| | | | | |
|---|---|---|---|---|
| 1,678,174 A | * | 7/1928 | White | E05B 13/101 292/DIG. 27 |
| 1,704,854 A | * | 3/1929 | Burgess | F16J 13/02 292/149 |
| 1,877,545 A | * | 9/1932 | Wise | F16B 41/005 70/231 |
| 3,434,312 A | * | 3/1969 | Buchman | E05B 73/0082 70/14 |
| 3,844,143 A | * | 10/1974 | Hudson | B60D 1/60 70/14 |
| 4,094,173 A | * | 6/1978 | Brown | B60R 25/06 70/232 |
| 4,441,344 A | * | 4/1984 | Kurpershoek | B60R 9/058 70/221 |
| 4,548,061 A | * | 10/1985 | Nilsson | E05B 9/082 70/232 |
| 4,848,112 A | * | 7/1989 | Graber | F16B 41/005 224/315 |
| 4,862,716 A | * | 9/1989 | Derman | F16B 41/005 70/166 |

(Continued)

*Primary Examiner* — Suzanne Barrett
(74) *Attorney, Agent, or Firm* — Citadel Patent Law; George A. Leone

(57) ABSTRACT

A locking cover includes a plate having a front surface with a solid raised panel, and a lock retaining housing. A side wall surrounds the perimeter of the plate. A first aperture runs through the front surface. A cavity is adjacent the first aperture, and the cavity includes a second aperture. A set of pin insertion channels run through the side wall and the cavity, terminating at one end in a wall within the plate. A blocking pin is adapted to be inserted in the set of pin insertion channels and be locked into place over the second aperture. A tubular cylinder lock is adapted to be inserted in the first aperture and into the lock retaining housing. A first fastener is adapted to be inserted through the second aperture to engage a second mating fastener.

20 Claims, 5 Drawing Sheets

(56) References Cited

U.S. PATENT DOCUMENTS

| | | | | |
|---|---|---|---|---|
| 5,010,748 A * | 4/1991 | Derman | ............ | A47B 97/00 |
| | | | | 70/164 |
| 5,214,945 A * | 6/1993 | Martin | ............ | B62D 53/085 |
| | | | | 70/167 |
| 5,794,463 A * | 8/1998 | McDaid | ............ | E05B 73/0005 |
| | | | | 248/553 |
| 5,890,859 A * | 4/1999 | Hasnik | ............ | B60R 21/2037 |
| | | | | 411/372 |
| 6,305,107 B1 * | 10/2001 | Parenti | ............ | B60R 13/105 |
| | | | | 40/201 |
| 6,519,985 B2 * | 2/2003 | Grant | ............ | E05B 73/0076 |
| | | | | 70/229 |
| 6,865,914 B2 * | 3/2005 | Irgens | ............ | B60D 1/06 |
| | | | | 70/14 |
| 7,520,709 B2 * | 4/2009 | Wang | ............ | F16B 41/005 |
| | | | | 411/396 |
| 7,673,482 B2 * | 3/2010 | Bosman | ............ | B60B 7/16 |
| | | | | 301/35.624 |
| 7,708,510 B2 * | 5/2010 | Reimler | ............ | F16B 37/14 |
| | | | | 24/455 |
| 8,991,226 B2 * | 3/2015 | Daniels | ............ | E05B 65/00 |
| | | | | 220/325 |
| 2001/0013235 A1 * | 8/2001 | Trempala | ............ | A62C 35/68 |
| | | | | 70/169 |
| 2003/0121297 A1 * | 7/2003 | Trempala | ............ | F16L 55/11 |
| | | | | 70/168 |
| 2006/0021396 A1 * | 2/2006 | Javaux | ............ | E02D 29/1427 |
| | | | | 70/168 |
| 2006/0201213 A1 * | 9/2006 | Burke | ............ | G02B 6/4451 |
| | | | | 70/168 |
| 2007/0227206 A1 * | 10/2007 | Stone | ............ | B62H 3/00 |
| | | | | 70/232 |
| 2011/0158765 A1 * | 6/2011 | Smith | ............ | F16B 41/005 |
| | | | | 411/373 |

* cited by examiner

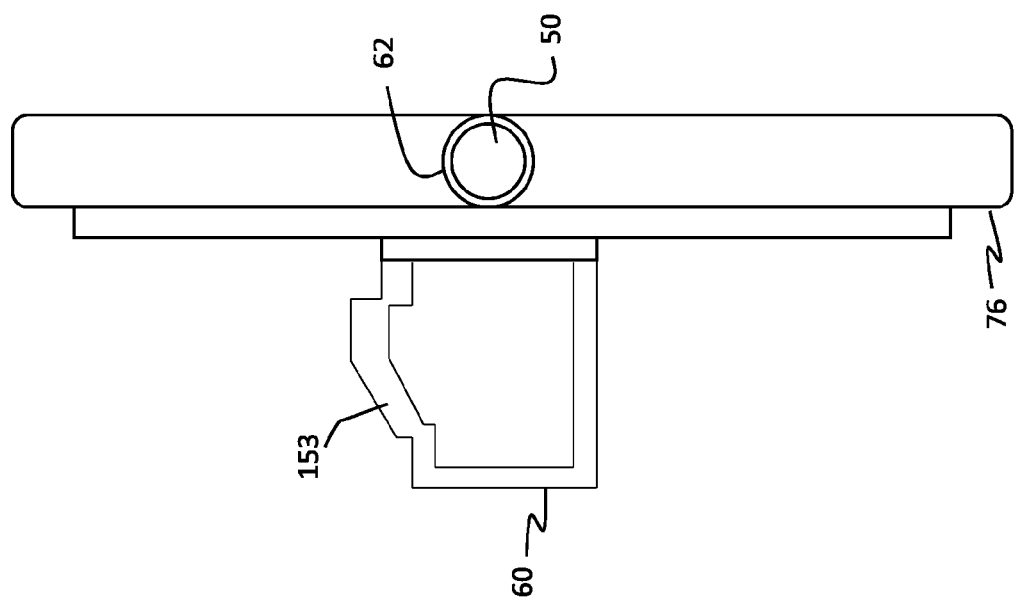

LOCKING COVER FOR UTILITY POLE

TECHNICAL FIELD

The present invention relates to locking covers for municipal electric power vaults in general, and, more particularly, to a locking cover for a utility pole or vault to deter theft of wires contained in the utility pole or vault.

BACKGROUND

Unauthorized access to copper wire and hardware within utility vaults and poles have been a growing problem for business and municipalities. To compound matters, these utility vaults and poles have removable covers, which can easily be detached with simple tools such as a screw driver or a wrench. Resulting vandalism and theft pose a direct safety issue to the public. Safety concerns are present whether an affected target is a shopping center parking lot light or municipal street lighting. The costs to repair and replace the infrastructure of these utilities are substantial.

As noted by the US Department of Energy in their report, "Fueled by economic growth, worldwide demand for copper has risen over the past several years. Supply has been unable to keep pace, pushing prices dramatically upward, particularly from 2003 through 2006 when the price per pound of copper rose from around $0.70 to as high as $4.00 by mid-2006 . . . . Tight supplies have led to an increase in copper recycling, which, in turn, has created a market for used copper and made the material a more attractive target for theft. In fact, thefts of copper wire have been on the rise across the United States, with no apparent geographic pattern and all sectors that use the material, including electric utilities, are being targeted." (*An Assessment of Copper Wire Thefts from Electric Utilities*, US DOE, April 2007).

While some cover locks are currently being marketed, they fall short as effective theft deterrents because they are too cumbersome, too expensive, too easily defeated and/or require special tools. For example, in the case of cover locks that require special tools for removal, the tools are typically common to every such cover. Thus, if a thief obtains a single special tool he can easily open large numbers of supposedly protected access panels.

The present disclosure provides new and novel solutions to overcome problems inherent in the prior art. In one aspect a locking cover that includes a uniquely keyed lock for every cover while still being easy to install and/or remove is described herein.

BRIEF SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A locking cover includes a plate having a front surface with a solid raised panel, and a lock retaining housing. A side wall surrounds the perimeter of the plate. A first aperture runs through the front surface. A cavity is adjacent the first aperture, and the cavity includes a second aperture. A set of pin insertion channels run through the side wall and the cavity, terminating at one end in a wall within the plate. A blocking pin is adapted to be inserted in the set of pin insertion channels and be locked into place over the second aperture. A tubular cylinder lock is adapted to be inserted in the first aperture and into the lock retaining housing. A first fastener is adapted to be inserted through the second aperture to engage a second mating fastener.

In one aspect the tubular cylinder lock comprises an outer cylinder housing having a key insert slot and a rear portion housing a spring bolt biased to protrude outwardly from the cylinder.

In another aspect the lock retaining housing includes an angular raised portion shaped to receive and contain the biased spring bolt.

In another aspect the plate includes a solid raised panel.

In another aspect the first fastener is a bolt and the second mating fastener is a clamp.

In another aspect the plate comprises a metal material has a shape that is selected from the group consisting of circular, oval, square, rectangular, hexagonal and octagonal.

In another aspect the fastener is inserted into the cover and fastened to the second mating fastener, the blocking pin is inserted above the first fastener head and the tubular cylinder lock is then inserted and locked and blocks one end of the blocking pin when in a secure mode.

In another aspect, when the tubular cylinder lock is locked into place in the first aperture, it prevents the blocking pin from being removed and thus access to the first fastener head is blocked.

Other benefits and advantages of the present invention will become apparent from the disclosure, claims and drawings herein.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 5 schematically shows a side view of an example of a blocking pin inserted in a locking cover as illustrated in FIG. 4.

Figure 1:
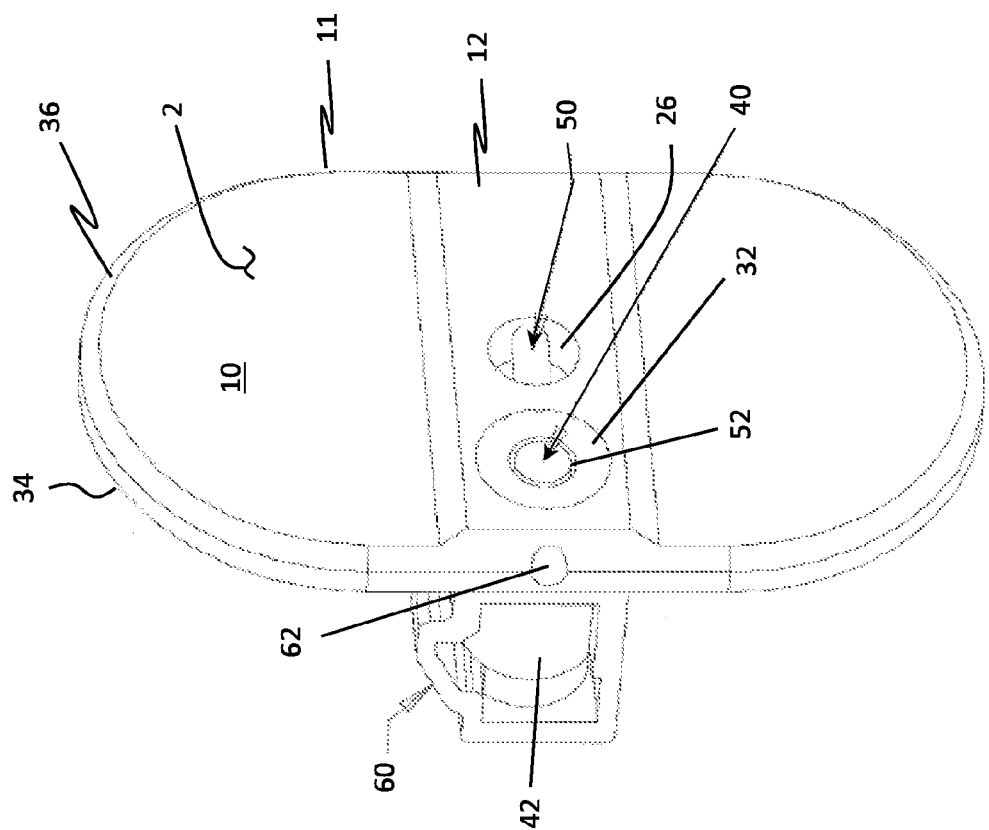
FIG. 1 schematically shows an example of a locking cover with a blocking pin locked in place.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes several embodiments and systems for a locking cover. Several features of methods and systems in accordance with example embodiments are set forth and described in the Figures. It will be appreciated that methods and systems in accordance with other example embodiments can include additional procedures or features different than those shown in the Figures. Example embodiments are described herein with respect to a locking cover for a utility pole or vault, such as a municipal utility vault. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or various combinations and variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
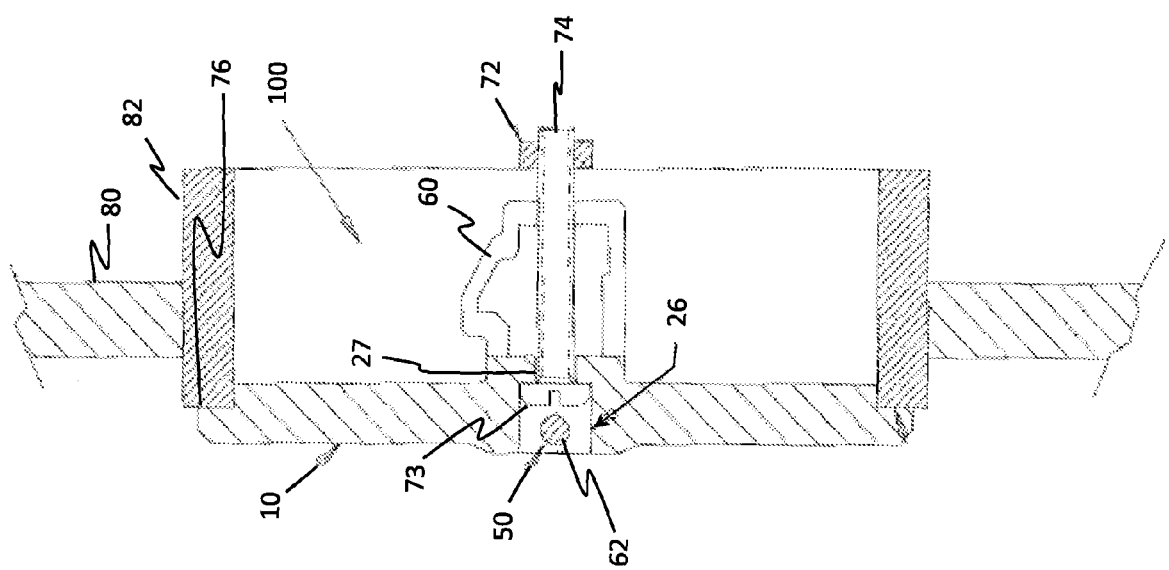
FIG. 2 schematically shows a cut-away side view of an example of a locking cover with a blocking pin locked in place as installed in a utility pole.

Referring now to FIG. 1, an example of a locking cover with a cover pin locked in place is schematically shown. A locking cover 10 includes a plate 11 having a front surface 2, a cavity 26, and a first aperture 32. The cavity 26 includes a second aperture 27 (as shown in FIG. 2). The locking cover 10 includes a side wall 34. The side wall 34 may optionally include a beveled edge 36 that surrounds the perimeter of the cover. A pin insertion channel 62 runs through the side wall 34 substantially bisecting the cavity 26. When installed, the locking cover 10 will include a tubular cylinder lock 40 and a blocking pin 50. The tubular cylinder lock 40 may be a conventional tubular cylinder lock having a key insert slot 52 and a rear portion 42. A lock retaining housing 60 is located to retain the tubular cylinder lock 40. An optional solid raised panel 12 may be included in one example design if desired. The raised panel 12 can provide additional width for housing the channels and blocking pin if desired.

In some useful examples, the locking cover 10 may advantageously comprise a metal material with a generally oval shape. However, the geometric shape of the cover may be of any desired geometric shape adapted to cover a portal or access hole in a utility pole, vault or other container such as circular, oval, square, rectangular, hexagonal, octagonal or equivalents. The blocking pin 50 may be any hard metal pin or rod sized to fit over a first fastener within the cavity and have each end held in a channel within the plate. The solid raised panel 12 comprises a thicker region for locating the cavity 26 and the pin insertion channel. The first fastener may be a metal bolt, screw or the like long enough to engage a second mating fastener within an access port. Those skilled in the art having the benefit of this disclosure will understand how to build and scale a locking cover for a given application.

Referring now to FIG. 2, a cut-away side view of an example of locking cover with a cover pin locked in place as installed in a utility pole or vault is schematically shown. A utility pole or vault has a wall 80 through which an access port 100 with a frame 82 is typically provided. The locking cover 10 includes an integral flange 76 which is sized to overlap the access portal frame 82. A first fastener 74, such as, for example a threaded bolt having a slotted head 73, is inserted through the second aperture 27 to engage a second mating fastener 72. The second mating fastener 72 may comprise a clamp or the like having a length larger than the frame 82 so as to bear against a part of the frame 82 when the first fastener 74 engages the second mating fastener 72 as by screwing it into the second mating fastener. Other fastening arrangements may also be used as will be appreciated by those skilled in the art having the benefit of this disclosure. In one example, the cavity 26 is sized to accept the first fastener 74 and has a depth suitable for allowing the blocking pin 50 to be positioned over the first fastener 74 and block access to the head 73.

Figure 3:
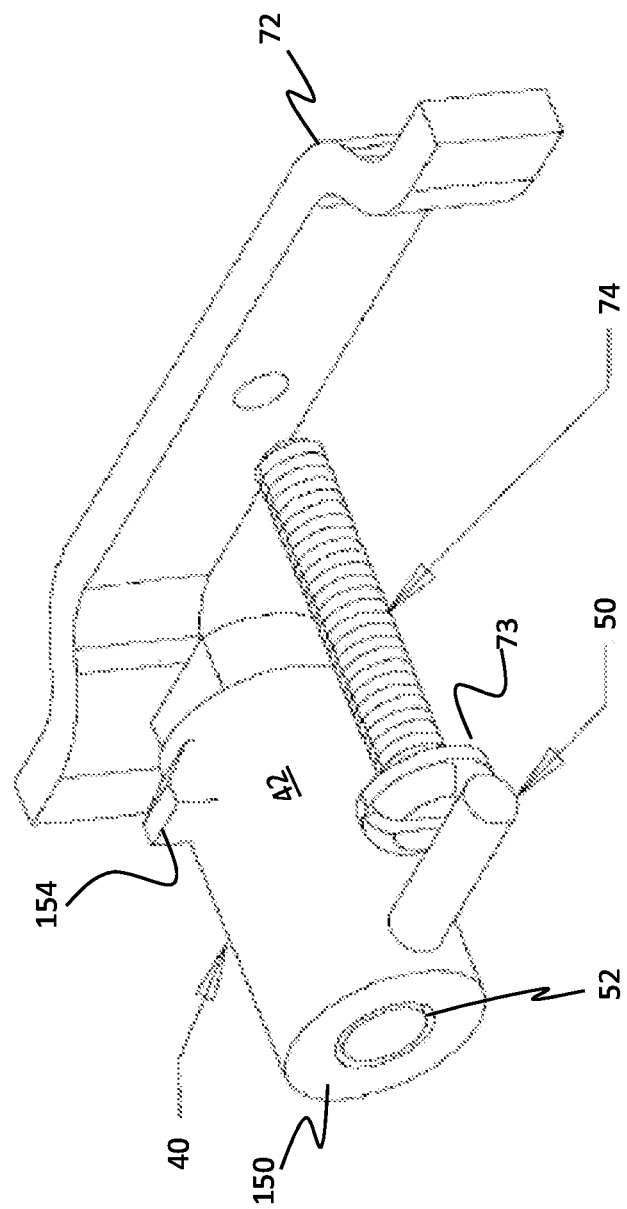
FIG. 3 schematically shows an example of the component relationships in a locking cover clamping arrangement.

Referring now to FIG. 3, an example of the component relationships in a locking cover clamping arrangement is schematically shown. In this example the cover has been removed so as to simplify the drawing and more easily show the general positional relationships of the locking elements. To secure a locking cover, the first fastener 74 is inserted into the cover and fastened to the second mating fastener 72. Then the blocking pin 50 is inserted above the first fastener head 73. To lock the blocking pin in place, the tubular cylinder lock 40 is then inserted and locked. When in the locked position the tubular cylinder lock 40 bears against one end of the blocking pin 50.

In some useful examples, where the tubular cylinder lock 40 is a conventional tubular cylinder the tubular cylinder lock 40 may comprise an outer cylinder housing 150 having a key insert slot 52 and a rear portion 42. The rear portion 42 houses a spring bolt 154 which is biased to protrude outwardly from the cylinder unless retracted by a key (not shown) engaging the lock. Tubular cylinder locks are among the most secure locks available because they are housed internally within the unit. They cannot be cut, since the locks don't protrude from the cover surface. Each lock is uniquely keyed. They are also substantially strike-proof, drill-proof and pick-proof. With reference particularly to FIG. 5, note that the lock retaining housing 60 includes an angular raised portion 153 shaped to receive and contain the un-retracted bolt 154, thus preventing the tubular cylinder lock from being removed without a key when the bolt fills the raised portion.

Figure 4:
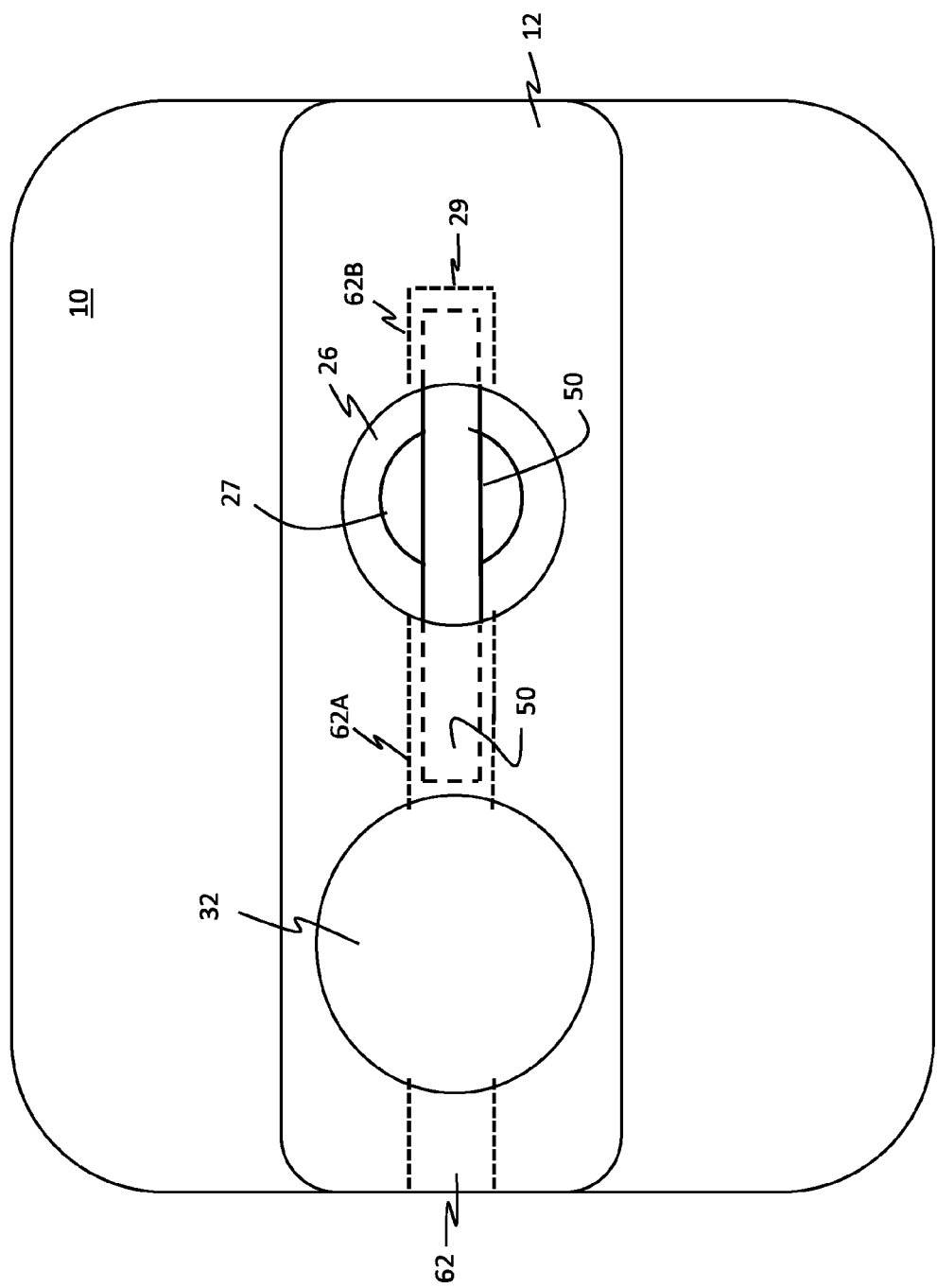
FIG. 4 schematically shows a top view of an example of a blocking pin inserted in a locking cover.

Referring now to FIG. 4 a top view of an example of a locking pin inserted in a locking cover is schematically shown. Here the blocking pin 50 is shown fully inserted into a set of linearly aligned channels 62, 62A, 62B. Channel 62 is open through to the first aperture 32 and aligned with channel 62B which is open on an opposite side of the first aperture 32. Channel 62A opens at a second end to a first side of the cavity 26. The third channel 62B is open to a second side of the cavity 26 and terminates at a wall 29 within the locking cover. When the tubular cylinder lock 40 is locked into place in the first aperture 32, it prevents the blocking pin 50 from being removed and thus access to the first fastener head is blocked.

Referring now to FIG. 5 a side view of an example of a locking pin inserted in a locking cover is schematically shown. In this view the tubular cylinder lock 40 is not present so as to not obscure the view to the blocking pin 50 as inserted in the aligned channels. When the tubular cylinder lock 40 is removed the blocking pin 50 is free to slide out through channel 62 and open access to the first fastener head for removal.

Having described the components of the locking cover it is now considered beneficial to the understanding of the invention to describe its operation and use. In a first mode, to lock the cover the first fastener is then inserted through the locking cover cavity and threaded into the second mating fastener while the plate is held in a position to engage a surface in the access port, such as the frame or wall sides around the port. Tightening the first fastener will draw the locking cover flange against the sides of the access port and in this way the locking cover will be securely fastened against the utility pole. Next, the blocking pin can be slid into position over the first fastener head. Then the tubular cylinder lock 40 is inserted and locked with a unique key (not shown). To remove the cover, the tubular cylinder lock 40 is unlocked and removed and the above process is reversed.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment, and devises, and that various modifications, both as to the equipment details and operating procedures, may be accomplished without departing from the true spirit and scope of the present invention.

What is claimed is:

1. A locking cover for a utility pole or vault comprising:
   a plate including a front surface and a back surface, the plate also including a side wall that surrounds the perimeter of the plate and a lock retaining housing attached to the back surface;
   a first aperture through the plate;
   a cavity within the front surface, the cavity being adjacent the first aperture, and the cavity including a second aperture;
   a set of linearly aligned pin insertion channels running transversely through the side wall, the first aperture and the cavity, and terminating at one end in a wall within the plate;
   a blocking pin adapted to be inserted into the set of linearly aligned pin insertion channels and to be locked into place over the second aperture;
   a tubular cylinder lock adapted to be inserted in the first aperture and into the lock retaining housing; and
   a first fastener adapted to be inserted through the second aperture to engage a second mating fastener affixed to the utility pole or vault.

2. The locking cover of claim 1 wherein the tubular cylinder lock comprises an outer cylinder housing having a key insert slot and a rear portion housing a spring bolt biased to protrude outwardly from the cylinder.

3. The locking cover of claim 2 wherein the lock retaining housing includes an angular raised portion shaped to receive and contain the biased spring bolt.

4. The locking cover of claim 1 wherein the plate includes a solid raised panel containing the set of linearly aligned pin insertion channels.

5. The locking cover kit of claim 1 wherein the first fastener is a bolt and the second mating fastener is a clamp.

6. The locking cover of claim 1 wherein the plate comprises a metal material has a shape that is selected from the group consisting of circular, oval, square, rectangular, hexagonal and octagonal.

7. The locking cover of claim 1 wherein when in a secure mode the fastener is inserted into the cover and fastened to the second mating fastener, the blocking pin is inserted above the first fastener head and the tubular cylinder lock is then inserted and locked and blocks one end of the blocking pin.

8. The locking cover of claim 7 wherein when the tubular cylinder lock is locked into place in the first aperture, it prevents the blocking pin from being removed and thus access to the first fastener head is blocked.

9. A locking cover kit for a utility pole, the kit comprising:
   a plate including,
      a front surface,
      a lock retaining housing,
      a side wall that surrounds the perimeter of the plate,
      a flange having a length adapted for engaging the utility pole,
      a first aperture through the plate,
      a cavity within the front surface, the cavity being adjacent the first aperture, and the cavity including a second aperture,
      a set of linearly aligned pin insertion channels running transversely through the side wall, the first aperture and the cavity and terminating at one end in a wall within the plate;
   a blocking pin adapted to be inserted into the set of linearly aligned pin insertion channels;
   a tubular cylinder lock adapted to be inserted in the first aperture and into the lock retaining housing;
   a first fastener adapted to be inserted through the second aperture; and
   a second fastener adapted to mate with the first fastener.

10. The locking cover kit of claim 9 wherein the tubular cylinder lock comprises an outer cylinder housing having a key insert slot and a rear portion housing a spring bolt biased to protrude outwardly from the cylinder.

11. The locking cover kit of claim 10 wherein the lock retaining housing includes an angular raised portion shaped to receive and contain the biased spring bolt.

12. The locking cover kit of claim 9 wherein the plate includes a solid raised panel.

13. The locking cover kit of claim 9 wherein the first fastener is a bolt and the second mating fastener is a clamp.

14. The locking cover kit of claim 9 wherein the plate comprises a metal material with a generally oval shape.

15. The locking cover kit of claim 9 wherein when in a secure mode the first fastener is adapted to be inserted into the cover and fastened to the second mating fastener, the blocking pin is adapted to be inserted above the first fastener head and the tubular cylinder lock is adapted to be inserted and locked to block one end of the blocking pin.

16. The locking cover kit of claim 15 wherein the plate comprises a metal material has a shape that is selected from the group consisting of circular, oval, square, rectangular, hexagonal and octagonal.

17. A locking cover for a utility pole or vault comprising:
   a plate including a front surface, the plate also including
      a side wall that surrounds the perimeter of the plate and
      a lock retaining housing attached to a back surface;
   a first aperture through the plate;
   a cavity within the front surface, the cavity being adjacent the first aperture, and the cavity including a second aperture;
   a set of linearly aligned pin insertion channels running transversely through the side wall, the first aperture and the cavity, and terminating at one end in a wall within the plate;
   a blocking pin adapted to be inserted into the set of pin insertion channels and be locked into place over the second aperture;

a tubular cylinder lock adapted to be inserted in the first aperture and into the lock retaining housing, wherein the tubular cylinder lock comprises an outer cylinder housing having a key insert slot and a rear portion housing a spring bolt biased to protrude outwardly from the cylinder, wherein the lock retaining housing includes an angular raised portion shaped to receive and contain the biased spring bolt; and a first fastener adapted to be inserted through the second aperture to engage a second mating fastener affixed to the utility pole or vault.

18. The locking cover kit of claim 17 wherein the first fastener is a bolt and the second mating fastener is a clamp.

19. The locking cover of claim 1 wherein the plate comprises a metal material has a shape that is selected from the group consisting of circular, oval, square, rectangular, hexagonal and octagonal.

20. The locking cover of claim 1 wherein when in a secure mode the fastener is inserted into the cover and fastened to the second mating fastener, the blocking pin is inserted above the first fastener head and the tubular cylinder lock is then inserted and locked and blocks one end of the blocking pin.

* * * * *